US012781801B2

(12) United States Patent
Capoldi

(10) Patent No.: US 12,781,801 B2
(45) Date of Patent: Nov. 3, 2026

(54) LARGE DIAMETER ROLLING BEARING

(71) Applicant: AKTIEBOLAGET SKF, Gothenburg (SE)

(72) Inventor: Bruno Capoldi, Charentenay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/035,045

(22) Filed: Jan. 23, 2025

(65) Prior Publication Data

US 2025/0251022 A1 Aug. 7, 2025

(30) Foreign Application Priority Data

Feb. 2, 2024 (DE) ........................ 102024200972.5

(51) Int. Cl.
*F16C 33/78* (2006.01)
*F16C 19/38* (2006.01)
*F16C 19/49* (2006.01)

(52) U.S. Cl.
CPC .......... *F16C 33/783* (2013.01); *F16C 19/381* (2013.01); *F16C 33/7886* (2013.01); *F16C 33/7889* (2013.01); *F16C 33/7896* (2013.01); *F16C 19/49* (2013.01); *F16C 2300/14* (2013.01)

(58) Field of Classification Search
CPC .... F16C 19/381; F16C 19/49; F16C 33/7803; F16C 33/783; F16C 33/7886; F16C 33/7889; F16C 33/7896; F16C 2300/14; F16C 2226/60
See application file for complete search history.

(56) References Cited

U.S. PATENT DOCUMENTS 9,989,090 B2 6/2018 Capoldi et al.
2013/0062833 A1* 3/2013 Frank .................. F16J 15/3268 277/345
2017/0356491 A1* 12/2017 Capoldi .............. F16C 33/7886
2022/0065296 A1 3/2022 Capoldi

FOREIGN PATENT DOCUMENTS

DE 202019002432 U1 * 6/2019 ............ F16C 33/581

OTHER PUBLICATIONS

Machine Translation of DE-202019002432-U1 (Year: 2019).*

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A rolling bearing includes a first ring and a second ring capable of rotating concentrically relative to each other, at least one row of rolling elements radially interposed between raceways of the rings, at least one row of rolling elements axially interposed between raceways of the rings, and at least one inner seal mounted on one of the first and second rings and coming into friction contact with the other ring of the first and second rings. The rolling bearing further includes at least one outer sealing assembly provided with a sealing shield mounted against the first ring and coming into friction contact with the second ring, the sealing shield being arranged outside the inner seal and defining together with the inner seal an annular sealed chamber.

11 Claims, 3 Drawing Sheets

LARGE DIAMETER ROLLING BEARING

CROSS-REFERENCE

This application claims priority to German patent application no. 102024200972.5 filed on Feb. 2, 2024, the contents of which are fully incorporated herein by reference.

BACKGROUND OF THE INVENTION

The present invention relates to bearings, more particularly to large-diameter rolling bearings that can accommodate axial and radial loads.

Large diameter rolling bearings typically include an inner ring and an outer ring arranged concentrically about an axis of rotation running in an axial direction, and at least one row of rolling elements arranged between the rings. Such large-diameter rolling bearings may be used, for example, in a tunnel boring machine, in a mining extraction machine or in a wind turbine.

As these rolling bearings are often used in aggressive environments, the bearings frequently include seals to prevent exterior elements, such as dust, metal particles or water, from getting inside the bearing and damaging its components. Typically, the rolling bearing includes an annular seal mounted on each side of the outer ring and contacting the inner ring to close or seal the radial space defined between these rings and inside of which are housed the rows of rolling elements.

Such an arrangement is disclosed, for example, in US patent application publication no. 2022/0065296 owned by Aktiebolaget SKF of Gothenburg, Sweden. However, such seals are often insufficient to prevent the entry of high pressure water flow, particularly during a bearing cleaning operation.

SUMMARY OF THE INVENTION

One aim of the present invention is to overcome the drawback noted above concerning high-pressure water flow. The present invention relates to a rolling bearing comprising a first ring and a second ring capable of rotating concentrically relative to one another, at least one row of rolling elements radially interposed between raceways of the rings, and at least one row of rolling elements axially interposed between raceways of the rings.

The rolling bearing further comprises at least one inner seal mounted on one of the first and second rings and coming into friction contact with the other ring of the first and second rings.

According to a general feature, the rolling bearing further comprises at least one outer sealing assembly provided with a sealing shield mounted against the first ring and coming into friction contact with the second ring, the sealing shield being arranged outside the inner seal and defining together with the inner seal an annular sealed chamber.

The sealing shield of the sealing assembly forms a first sealing barrier and the inner seal forms a second sealing barrier to stop potential residual entries that pass through the sealing assembly. The sealing shield enables to prevent the entry of water under high pressure flow and improve the life of the seal.

Also, with the disposition of the sealing shield in contact with one of the rings, the mounting is easy to implement and reliable. There is no empty space between the sealing shield and the ring. Additionally, with such a disposition, if the sealed chamber is filled with lubricant, the volume of lubricant required is low.

According to further aspects which are advantageous but not compulsory, such a rolling bearing may incorporate one or several of the following features.

The sealing shield of outer sealing assembly may have, in a free state, a flat form.

The outer sealing assembly may further be provided with a fixing ring secured to the first ring and mounted against the sealing shield, the sealing shield being interposed between the fixing ring and the first ring. Such an arrangement is very compact, reliable and economic.

The outer sealing assembly may be further provided with a plurality of fasteners, preferably screws, extending through the fixing ring and sealing shield, and secured to the first ring.

The outer sealing assembly may be further provided with a plurality of insert rings each mounted into a through-hole provided on the sealing shield, each screw extending through one of the insert rings.

The fixing ring of the outer sealing assembly may be engaged into a groove provided on the first ring.

The second ring may comprise a shoulder against which the sealing shield of the outer sealing assembly comes into friction contact.

The first ring may comprise a shoulder against which is mounted the sealing shield of the outer sealing assembly.

The inner seal may be mounted on the second ring. The inner seal may come into friction contact with a surface of the second ring which is offset inwards with respect to the shoulder.

The inner seal may be mounted on the shoulder of the second ring.

The inner seal may be mounted on the first ring.

BRIEF DESCRIPTION OF THE SEVERAL VIEWS OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
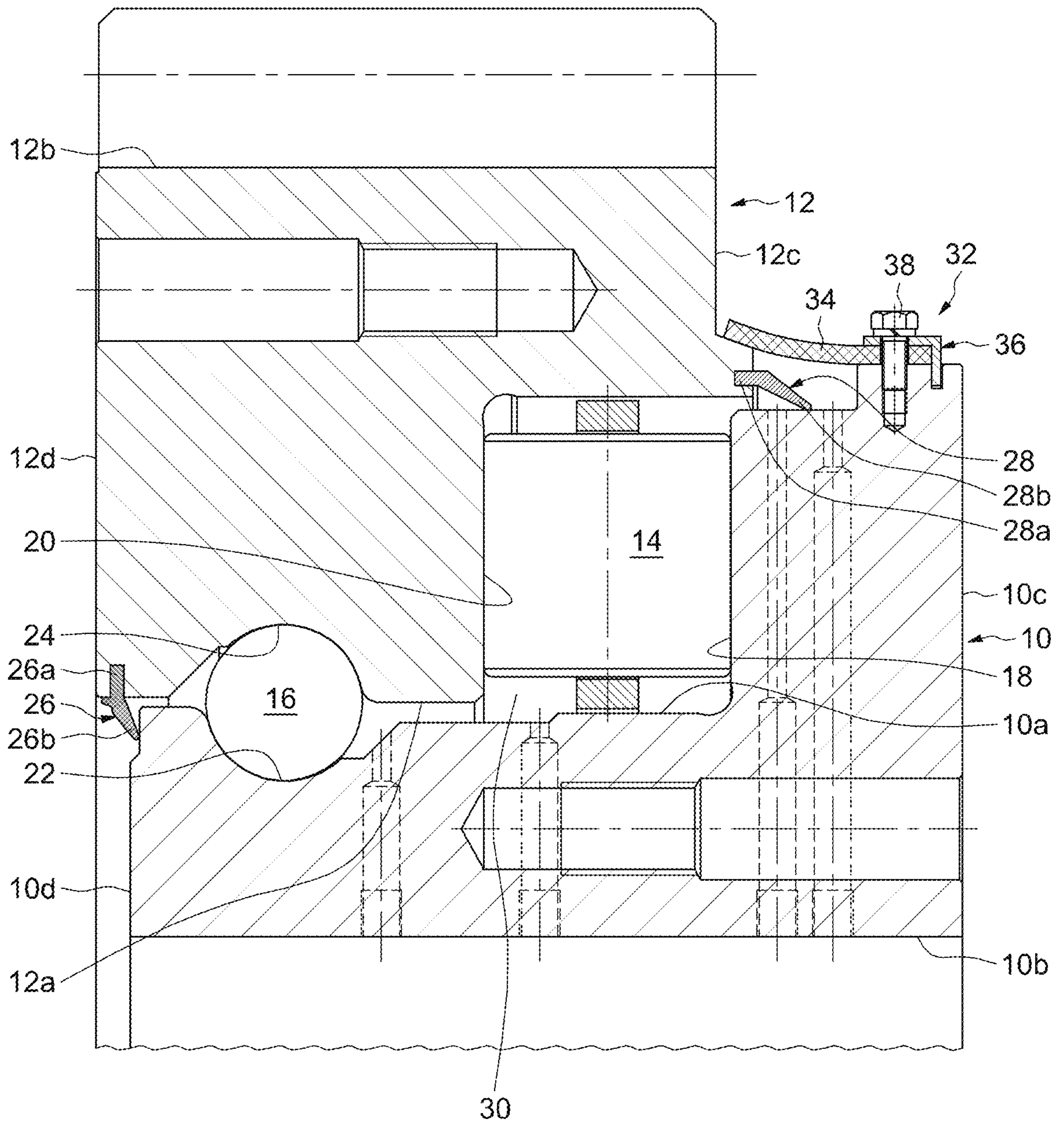
FIG. 1 is a partial cross-section of a rolling bearing according to an example of the invention.

A rolling bearing as depicted in FIG. 1 is a large-diameter rolling bearing comprising a first ring 10 and a second ring 12. In the illustrated example, the first ring 10 is an inner ring whereas the second ring 12 is an outer ring. In this example, the outer ring 12 is a rotative or rotatable ring and the inner ring 10 is a non-rotative or “fixed” ring. The rolling bearing may be used, for example, in a tunnel boring machine, a wind turbine, a big offshore crane, mining applications, such as stacker reclaimer, or any other applications using a large diameter rolling bearing.

The inner and outer rings 10, 12 are concentric and extend axially along the bearing rotation axis (not shown) which extends in an axial direction. The rings 10, 12 are of a solid type.

In the illustrated example, the rolling bearing comprises a row of rollers 14 and a row of balls 16 which are arranged between the inner and outer rings 10, 12. The rollers 14 are preferably identical to each other and each roller 14 has a cylindrical outer rolling surface. The axis of rotation of each roller 14 is perpendicular to the axis of the bearing. The rollers 14 are interposed axially between annular radial raceways 18, 20 respectively formed on the inner and outer rings 10, 12. The raceways 18, 20 face each other in the axial direction. The rolling surface of each roller 14 is in axial contact with the raceways 18, 20.

The balls 16 are interposed radially between toroidal circular raceways 22, 24 respectively formed on the inner and outer rings 10, 12. The raceways 22, 24 face each other in the radial direction.

The inner ring 10 includes an outer stepped cylindrical surface 10*a* from which the raceways 18, 22 are formed, and an inner cylindrical bore 10*b* which is radially opposite to the outer surface 10*a*. The inner ring 10 further includes two opposite first and second frontal faces 10*c*, 10*d* which axially delimit the outer surface 10*a* and the bore 10*b*.

The outer ring 12 includes an inner stepped surface or bore 12*a* from which the raceways 20, 24 are formed, and an outer cylindrical surface 12*b* which is radially opposite to the bore 12*a*. In the illustrated example, the outer surface 12*b* is provided with a gear teeth (not referenced). The outer ring 12 further includes two opposite first and second frontal faces 12*c*, 12*d* which axially delimit the outer surface 12*b* and the bore 12*a*.

In the illustrated example, the rolling bearing comprises an annular seal 26 mounted on the outer ring 12 and coming into frictional contact with, i.e., frictionally engaging, the inner ring 10. The seal 26 comes into contact with the frontal face 10*d* of the inner ring. The seal 26 is mounted into a groove (not referenced) formed on the bore 12*a* of the outer ring. The seal 26 is provided with a heel 26*a* mounted into the groove of the outer ring 12, and with a lip 26*b* extending from the heel and coming into frictional contact with the inner ring 10. The lip 26*b* extends obliquely inwardly from the heel 26*a*, the heel 26*a* extending radially.

Alternatively, it is possible to provide a reversed arrangement for the seal 26 with the seal 26 mounted on the inner ring 10 and frictionally contacting the outer ring 12.

The rolling bearing further comprises an annular seal 28 mounted on the outer ring 12 and coming into frictional contact or engagement with the inner ring 10. The seal 28 is mounted axially on the opposite side to the seal 26. Thus, the rolling bearing comprises on each side a separate seal 26, 28.

The seals 26, 28 close or enclose the radial space that exists between (i.e., is defined between) the inner and outer rings 10, 12. This radial space is defined between the bore 12*a* of the outer ring 12, and the outer surface 10*a* of the inner ring 10.

More specifically, a closed or enclosed space 30 is defined between the inner and outer rings 10, 12 and the seals 26, 28 within which the rows of rollers 14 and balls 16 are housed. The seals 26, 28 are preferably made of rubber, and more particularly of nitrile butadiene rubber (NBR).

Further, the seal 28 comes into contact with the outer surface 10*a* of the inner ring 10 near or proximal to the rollers 14. The seal 28 is mounted within in a groove (not referenced) formed on the frontal face 12*c* of the outer ring 12. The seal 28 includes an axially-extending heel 28*a* mounted into or disposed within the groove of the outer ring 12 and a lip 28*b* extending from the heel 28*a* and coming into frictional contact with the inner ring 10. Specifically, the lip 28*b* extends obliquely inwardly from the heel 28*a*.

Alternatively, it is possible to provide a reversed arrangement for the seal 28, in which the seal 28 mounted on the inner ring 10 and frictionally contacts the outer ring 12.

Figure 2:
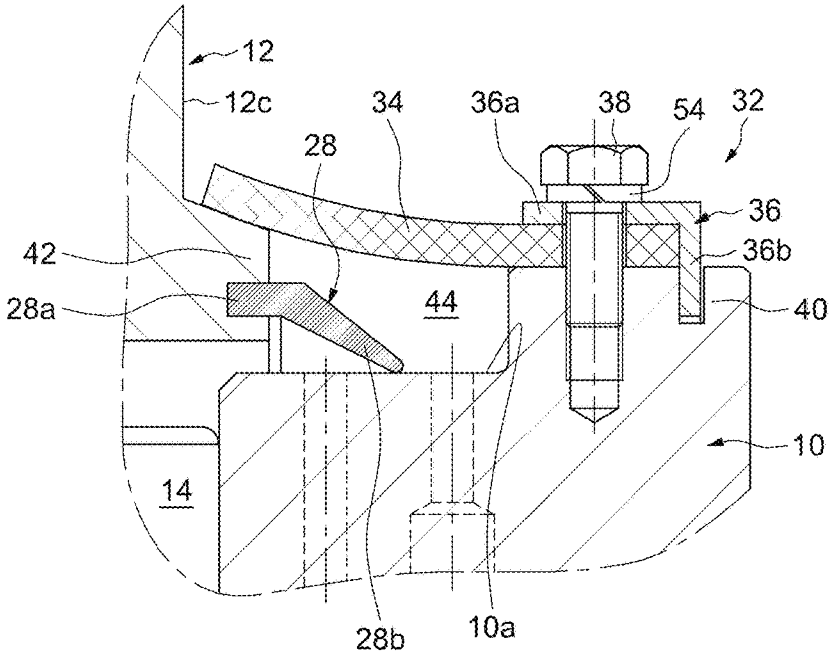
FIG. 2 is a detail view of FIG. 1.

As shown on FIGS. 1 and 2, the rolling bearing further comprises an annular sealing assembly 32 mounted on the inner ring 10 and offset outwardly with respect to the seal 28. Specifically, the sealing assembly 32 is radially offset outwardly with respect to the seal 28.

The sealing assembly 32 is arranged outside the inner seal 28. The sealing assembly 32 forms a first outer sealing barrier and the seal 28 forms a second sealing barrier to stop potential residual contaminants that may pass through the sealing assembly 32.

The sealing assembly 32 includes an annular sealing shield 34 mounted against the first ring 10 and coming into friction contact with, or frictionally engaging with, the second ring 12. The sealing shield 34 is preferably made of rubber, and more particularly of nitrile butadiene rubber (NBR).

The sealing assembly 32 further includes an annular fixing ring 36 and a plurality of fasteners 38, preferably screws, to secure the sealing shield 34 and the fixing ring 36 to the inner ring 10. Specifically, the sealing shield 34 is interposed or disposed between the fixing ring 36 and the inner ring 10. Preferably, the sealing shield 34 is radially interposed between the fixing ring 36 and the inner ring 10.

The sealing shield 34 is mounted against the outer surface 10*a* of the inner ring 10. In the illustrated example, the outer surface 10*a* of the inner ring 10 is provided with an annular shoulder 40 extending radially outwardly. The shoulder 40 is provided to position and fix the sealing shield 34 on the inner ring 10. The sealing shield 34 is mounted against the shoulder 40. More specifically, the sealing shield 34 is preferably radially mounted against the shoulder 40.

Figure 3:
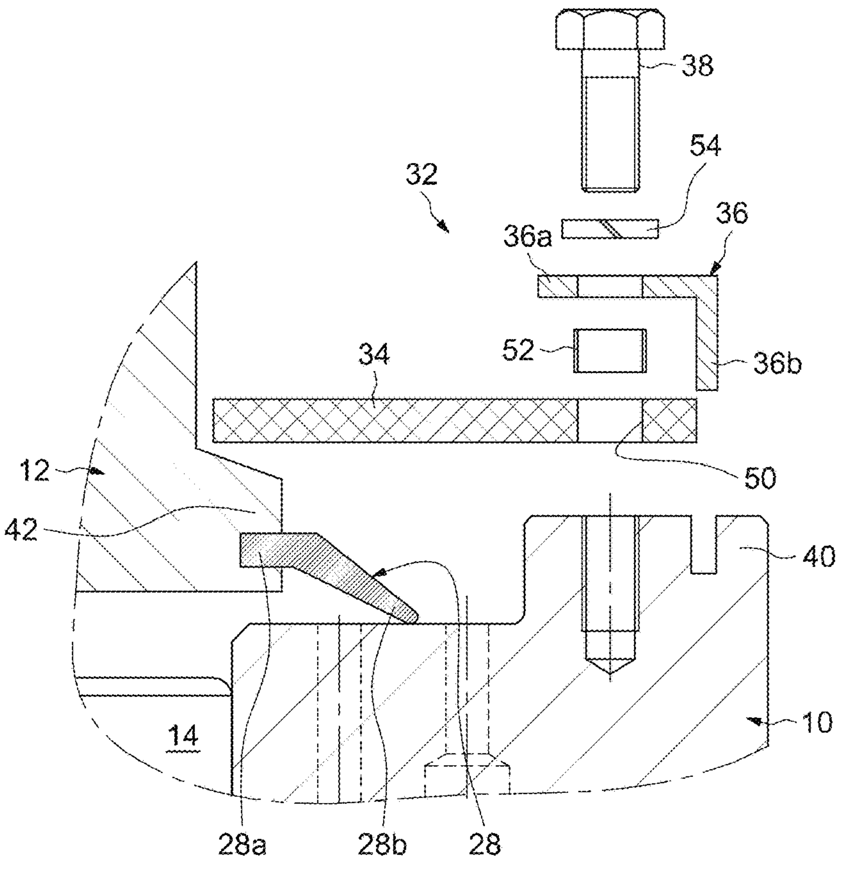
FIG. 3 is an exploded view of FIG. 2.

The sealing shield 34 extends towards the outer ring 12 and comes into frictional contact with an annular shoulder 42 provided on the frontal face 12*c* of the outer ring 12. The shoulder 42 preferably extends axially outwardly and the free end of the sealing shield 34 comes into friction contact against the shoulder 42. A part or portion of the sealing shield 34 is bent outwardly due to the contact against the shoulder 42. In a free state, the sealing shield 34 has a flat form as shown on FIG. 3. The groove inside of which is mounted the seal 28 is provided on the shoulder 42. The seal 28 contacts the outer surface 10*a* of the inner ring 10 at a position offset radially inwardly with respect to the shoulder 40.

The seal 28 is fixed to the outer ring 12 and rests against the inner ring 10, while the sealing shield 34 is fixed to the inner ring 10 and rests against the outer ring 12. These opposite arrangements form a labyrinth that improves the seal-tightness or sealing efficiency. If any pollutants or contaminants pass through the free end of the sealing shield 34, such pollutants/contaminants then face the lip 28*b* of seal 28.

Alternatively, a reversed arrangement may be provided in which the sealing shield 34 is fixed to the outer ring 12 and rests against the inner ring 10, and the seal 28 fixed to the inner ring 10 and rests against the outer ring 12. In another embodiment, the sealing shield 34 and the seal 28 may be both fixed to the inner ring 10 or be both fixed to the outer ring 12.

An annular sealed chamber 44 is defined between the sealing shield 34 and the seal 28. More precisely, the chamber 44 is delimited by the sealing shield 34, the seal 28 and the inner and outer rings 10, 12. More specifically, the chamber 44 is radially delimited by the sealing shield 34, the seal 28 and the outer surface 10*a* of the inner ring 10, and axially delimited by the shoulders 40, 42 and the seal 28. The chamber 44 may at least partially filled with a lubricant, such as for example, grease.

The fixing ring 36 of the sealing assembly 32 is mounted against the sealing shield 34 and secured to the inner ring 10. Preferably, the fixing ring 36 has L-shaped cross-sections. The fixing ring 36 includes a first part 36*a* mounted against the sealing shield 34 and a second part 36*b* extending from the first part 36*a* and inserted inside a groove (not indicated) of the shoulder 40 of the inner ring 10. The first part 36*a* extends axially and the second part 36*b* extends radially. The fixing ring 36 may be made from steel. Further, the fixing ring 36 may be segmented and formed of a plurality of ring segments in contact in the circumferential direction and secured together.

Each one of the fixing ring 36 and the sealing shield 34 is provided with a plurality of aligned through-holes 48, 50 to be secured by the screws/fasteners 38 to the inner ring 10. The through-holes 48 are provided on the first part 36*a* of the fixing ring 36 and the through-holes 50 extend through the thickness of the sealing shield 34.

Each screw 38 extends through a separate one of the through-holes 48 of the fixing ring 36 and the associated through-hole 50 of the sealing shield 34, and is engaged inside a threaded hole (not referenced) extending into the inner ring 10 from the shoulder 40. The screws 38 are spaced apart in the circumferential direction, preferably regularly or evenly.

The sealing assembly 32 further includes a plurality of annular insert rings 52 each mounted into or disposed within a separate one of the through-holes 50 of the sealing shield 34. Each screw 38 extends through a separate one of the insert rings 52. The sealing assembly 32 also includes a plurality of washers 54 each interposed between the head of one screw 38 and the first part 36*a* of the fixing ring 36. The insert rings 52 and washers 54 may be made from steel.

Figure 4:
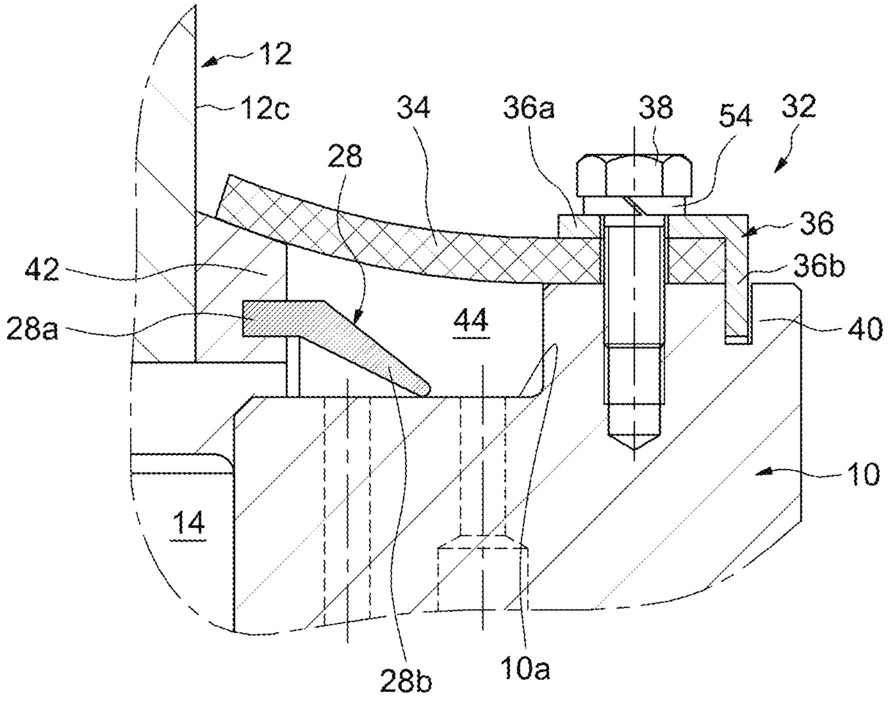
FIG. 4 is a partial cross-section of a rolling bearing according to another example of the invention.

The example shown on FIG. 4, in which identical parts are given identical references, differs from the first example in that the shoulder 42 is an additional or separate part secured to the outer ring 12 by any appropriate means, for example, by screwing, fasteners or welding.

In the illustrated examples, the sealing assembly 32 is offset radially outwardly with respect to the seal 28. The sealing shield 32 may also be arranged outside of the inner seal 28 in other arrangement(s). For example, the sealing assembly 32 may be offset axially outwardly with respect to the seal 28. In another variant, the sealing assembly 32 may be offset radially inwardly with respect to the seal 28.

In the disclosed examples, the "first ring" of the rolling bearing is the inner ring 10 whereas the "second ring" is the outer ring 12. Alternatively, it is possible to provide a reversed arrangement in which the "first ring" is the outer ring and the "second ring" is the inner ring.

In the illustrated examples, the rolling bearing is provided with one row of rollers 14 and one row of balls 16. Alternatively, the rolling bearing may comprise three or more rows of rolling elements, such as rollers and/or balls.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A rolling bearing comprising:

a first ring having at least one radial raceway and at least one axial raceway;

a second ring having at least one radial raceway and at least one axial raceway, at least one of the first ring and the second ring being capable of rotating concentrically relative to the other one of the first ring and the second ring;

at least one row of rolling elements radially interposed between the at least one radial raceway of the first ring and the at least one radial raceway of the second ring;

at least one row of rolling elements axially interposed between the at least one axial raceway of the first ring and the at least one axial raceway of the second ring;

at least one inner seal mounted on one of the first ring and the second ring and frictionally contacting the other one of the first ring and the second ring; and at least one outer sealing assembly including a cylindrical sealing shield having a first axial end mounted against an exterior outer circumferential surface of the first ring and a second axial end frictionally contacting an exterior outer circumferential surface of the second ring, the sealing shield being arranged radially outwardly of the inner seal and defining together with the inner seal an annular sealed chamber.

2. The rolling bearing according to claim 1, wherein the sealing shield of the at least one outer sealing assembly has a cylindrical form in a free state.

3. The rolling bearing according to claim 1, wherein the at least one outer sealing assembly is further provided with a fixing ring secured to the first ring and mounted against the sealing shield, the first axial end of the sealing shield being disposed upon the exterior surface of the first ring and sandwiched radially between the fixing ring and the first ring.

4. The rolling bearing according to claim 3, wherein the outer sealing assembly further includes a plurality of fasteners extending through the fixing ring and the sealing shield and secured to the first ring.

5. The rolling bearing according to claim 4, wherein the outer sealing assembly further includes a plurality of insert rings each disposed within a separate one of a plurality of through-holes extending through the sealing shield, each fastener extending through a separate one of the plurality of insert rings.

6. The rolling bearing according to claim 3, wherein the fixing ring of the outer sealing assembly is engaged into a groove provided on the first ring.

7. The rolling bearing according to claim 1, wherein the second ring includes a shoulder against which the sealing shield of the outer sealing assembly comes into frictional contact.

8. The rolling bearing according to claim 1, wherein the first ring includes a shoulder against which is mounted the sealing shield of the outer sealing assembly.

9. The rolling bearing according to claim 1, wherein the inner seal is mounted on the second ring.

10. The rolling bearing according to claim 9, wherein the inner seal is mounted on a shoulder of the second ring.

11. A rolling bearing comprising:

a first ring having at least one radial raceway and at least one axial raceway;

a second ring having at least one radial raceway and at least one axial raceway, at least one of the first ring and the second ring being capable of rotating concentrically relative to the other one of the first ring and the second ring;

at least one row of rolling elements radially interposed between the at least one radial raceway of the first ring and the at least one radial raceway of the second ring;

at least one row of rolling elements axially interposed between the at least one axial raceway of the first ring and the at least one axial raceway of the second ring;

at least one inner seal mounted on one of the first ring and the second ring and frictionally contacting the other one of the first ring and the second ring; and at least one outer sealing assembly including a sealing shield mounted against the first ring and frictionally contacting the second ring, the sealing shield being arranged outside of the inner seal and defining together with the inner seal an annular sealed chamber;

wherein the at least one outer sealing assembly is further provided with a fixing ring secured to the first ring and mounted against the sealing shield, the sealing shield being interposed between the fixing ring and the first ring, a plurality of fasteners extending through the fixing ring and the sealing shield and secured to the first ring, and a plurality of insert rings each disposed within a separate one of a plurality of through-holes extending through the sealing shield, each fastener extending through a separate one of the plurality of insert rings.

* * * * *